United States Patent
Hasegawa et al.

(10) Patent No.: US 10,048,122 B2
(45) Date of Patent: Aug. 14, 2018

(54) PYRANOMETER

(71) Applicant: EKO INSTRUMENTS CO., LTD., Tokyo (JP)

(72) Inventors: Toshikazu Hasegawa, Tokyo (JP); Akihito Akiyama, Tokyo (JP); Naoto Shimada, Tokyo (JP)

(73) Assignee: EKO INSTRUMENTS CO., LTD., Tokyo (JP)

( * ) Notice: Subject to any disclaimer, the term of this patent is extended or adjusted under 35 U.S.C. 154(b) by 0 days.

(21) Appl. No.: 15/488,148

(22) Filed: Apr. 14, 2017

(65) Prior Publication Data

US 2017/0219428 A1   Aug. 3, 2017

Related U.S. Application Data

(63) Continuation of application No. 15/515,129, filed as application No. PCT/JP2015/079101 on Oct. 14, 2015.

(30) Foreign Application Priority Data

Jul. 15, 2015 (JP) .................................. 2015-141623
Sep. 18, 2015 (JP) .................................. 2015-185829

(51) Int. Cl.
*G01J 5/00* (2006.01)
*G01J 1/04* (2006.01)
*G01J 1/44* (2006.01)
*G01W 1/12* (2006.01)

(52) U.S. Cl.
CPC .............. *G01J 1/0474* (2013.01); *G01J 1/44* (2013.01); *G01W 1/12* (2013.01)

(58) Field of Classification Search
CPC ................... G01J 5/02; G01J 5/04; G01J 5/08
See application file for complete search history.

(56) References Cited

U.S. PATENT DOCUMENTS

| | | | | |
|---|---|---|---|---|
| 5,347,869 A * | 9/1994 | Shie | ........................ | G01L 21/12 73/708 |
| 5,781,351 A * | 7/1998 | Murakami | .............. | G02B 7/025 359/808 |
| 6,072,573 A * | 6/2000 | Kruger | .................. | G01J 1/4257 250/214 SW |
| 6,348,650 B1 * | 2/2002 | Endo | .......................... | G01J 5/12 136/201 |
| 6,528,782 B1 * | 3/2003 | Zhang | ........................ | B60J 3/04 250/205 |
| 2004/0079888 A1 * | 4/2004 | Inamura | .................... | G01J 5/02 250/353 |

(Continued)

FOREIGN PATENT DOCUMENTS

JP   S54-130174 A   10/1979
JP   S60-100079 A   6/1985

(Continued)

OTHER PUBLICATIONS

LIC light measurement brochure, Jun. 2015, 24 pages downloaded from https://www.licor.com/env/products/light/pyranometer.html.*

(Continued)

*Primary Examiner* — Kiho Kim

(57) ABSTRACT

A pyranometer, comprises a thermal sensor, and a diffusing member positioned so as to be opposed to a receiving surface of the thermal sensor.

20 Claims, 16 Drawing Sheets

(56) References Cited

U.S. PATENT DOCUMENTS

| | | | |
|---|---|---|---|
| 2005/0081905 A1* | 4/2005 | Lan | G01K 7/04 136/224 |
| 2008/0251722 A1 | 10/2008 | Hayashi et al. | |
| 2011/0164655 A1 | 7/2011 | Nawai et al. | |
| 2015/0041664 A1 | 2/2015 | Anderson et al. | |
| 2015/0076651 A1 | 3/2015 | Noguchi | |

FOREIGN PATENT DOCUMENTS

| | | | |
|---|---|---|---|
| JP | S60-100628 U | | 7/1985 |
| JP | 04098883 A | * | 3/1992 |
| JP | H06-062332 U | | 9/1994 |
| JP | 2007-132730 A | | 5/2007 |
| JP | 2008-026285 A | | 2/2008 |
| JP | 2008-128913 A | | 6/2008 |
| JP | 2012-184969 A | | 9/2012 |
| JP | 2014-077783 A | | 5/2014 |
| WO | 2006/120862 A1 | | 11/2006 |

OTHER PUBLICATIONS

International Search Report for PCT/JP2015/079101, dated Jan. 12, 2016.
Frank Vignola et al., "Solar and Infrared Radiation Measurements", Apr. 26, 2012, CRC Press.
Kato, Tadashi, "Pyranometer Principle and Structure", Solar energy, May 31, 2013, vol. 39, No. 3, pp. 11-14, ISSN 0388-9564 (This non-patent literature is cited in International Search report for PCT/JP2015/079101.).
Japan Patent Office, Office Action for JP Patent Application No. 2015-203253, dated Jan. 4, 2016.
Japan Patent Office, Office Action for JP Patent Application No. 2015-203253, dated May 26, 2016.
Written Opinion of the International Searching Authority for PCT/JP2015/079101, dated Jan. 12, 2016.
Notice of Allowance for U.S. Appl. No. 15/515,129 (which is a parent application of the present application), dated Oct. 27, 2017.

* cited by examiner

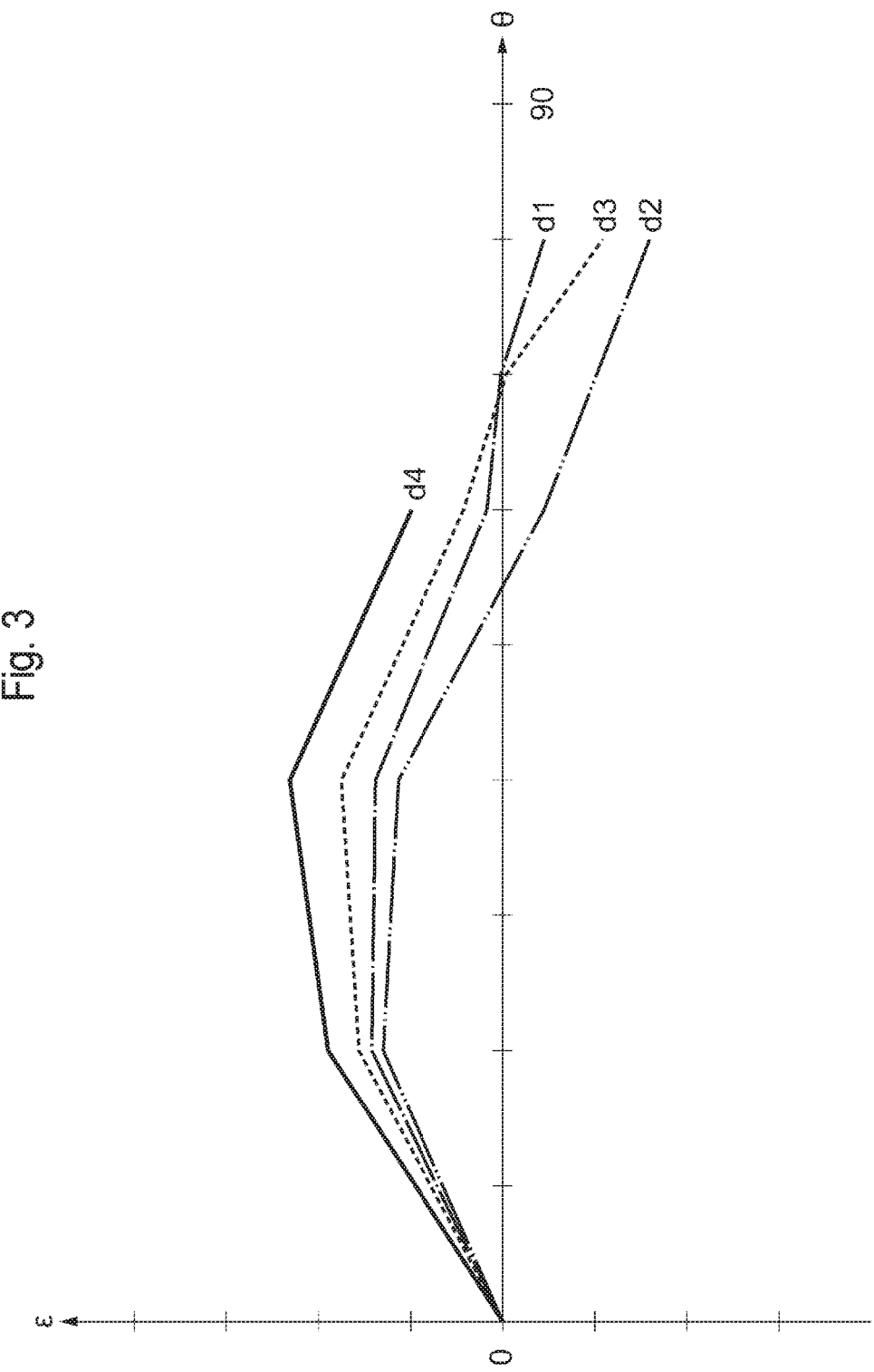

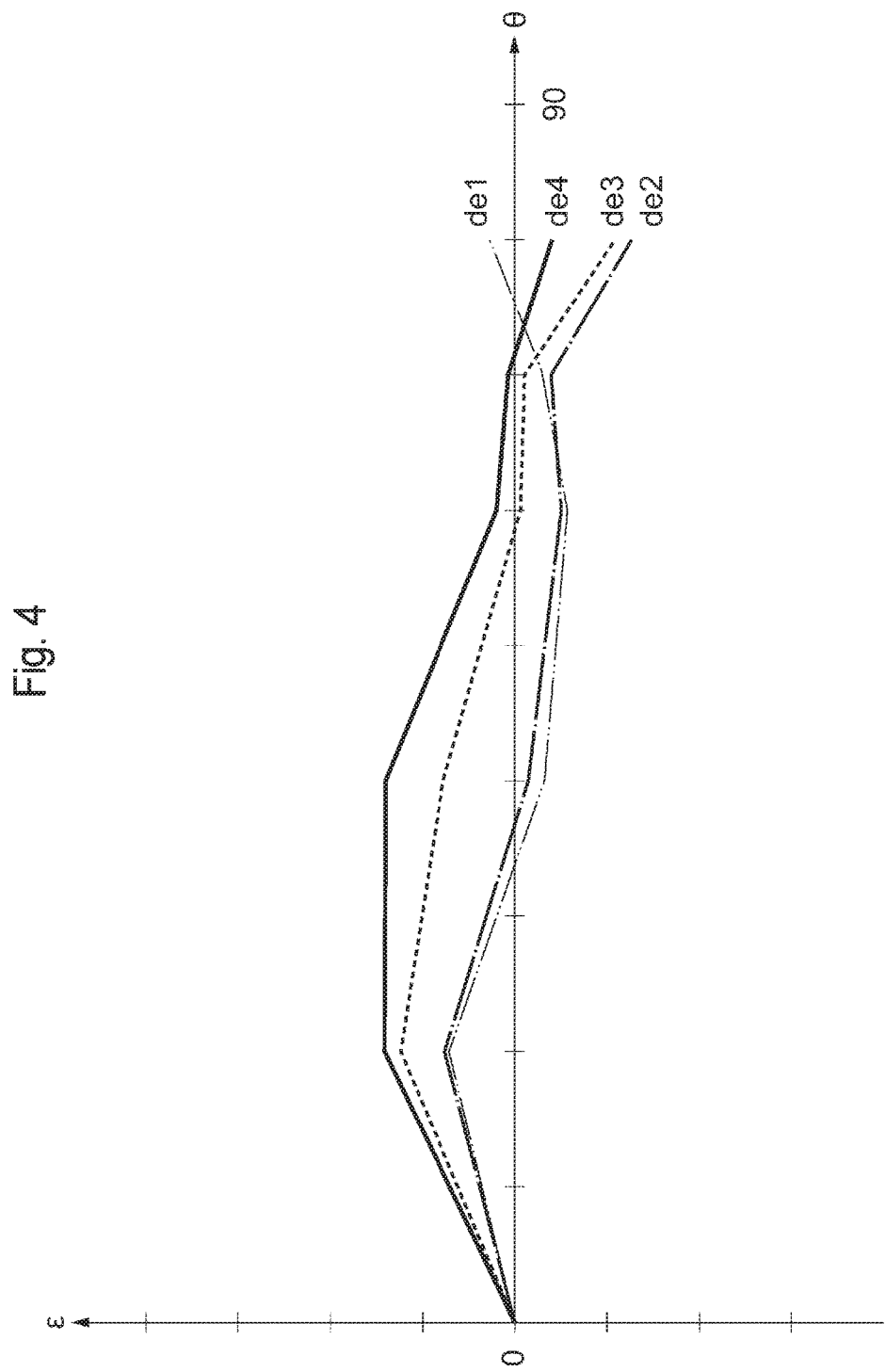

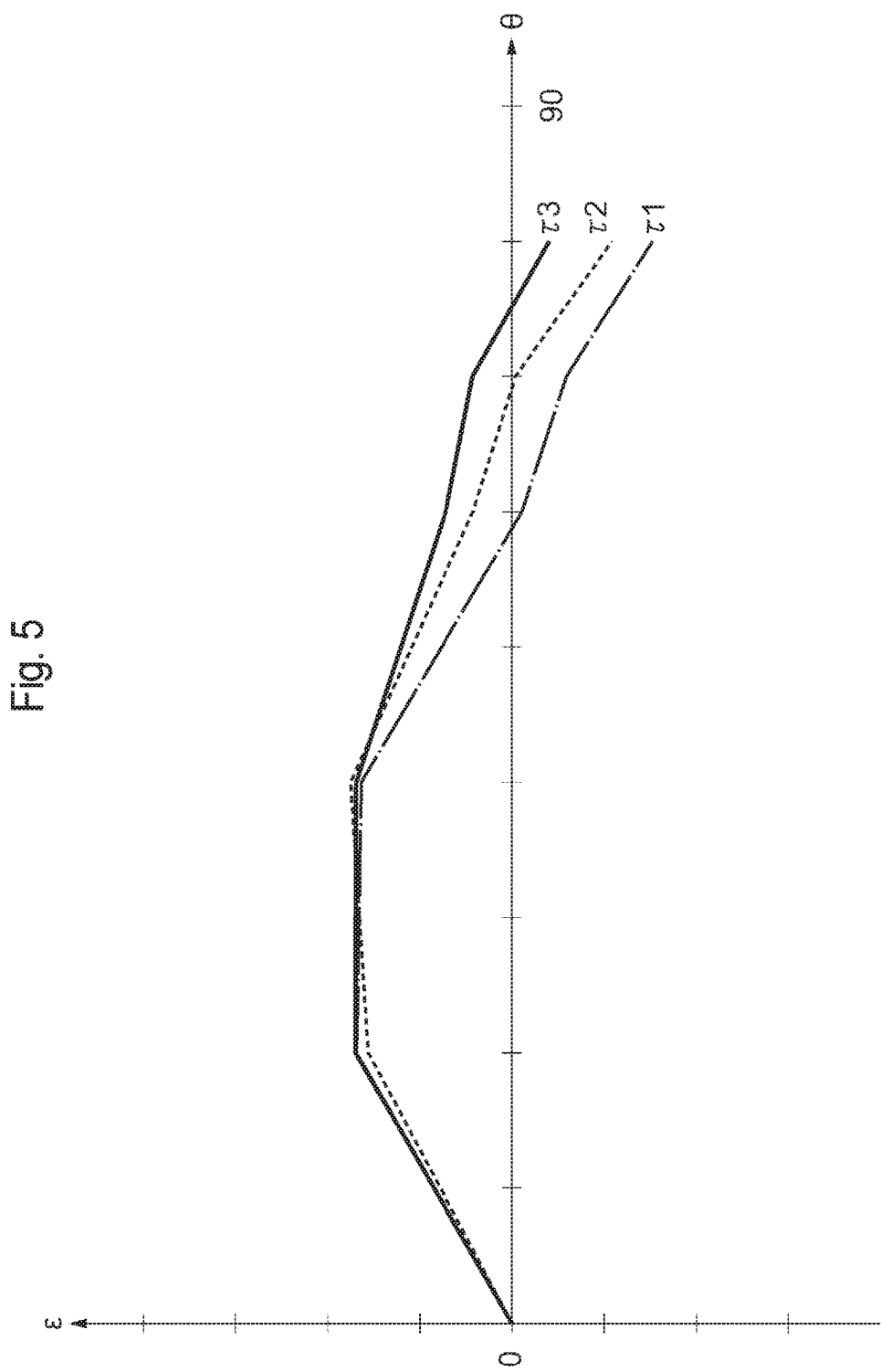

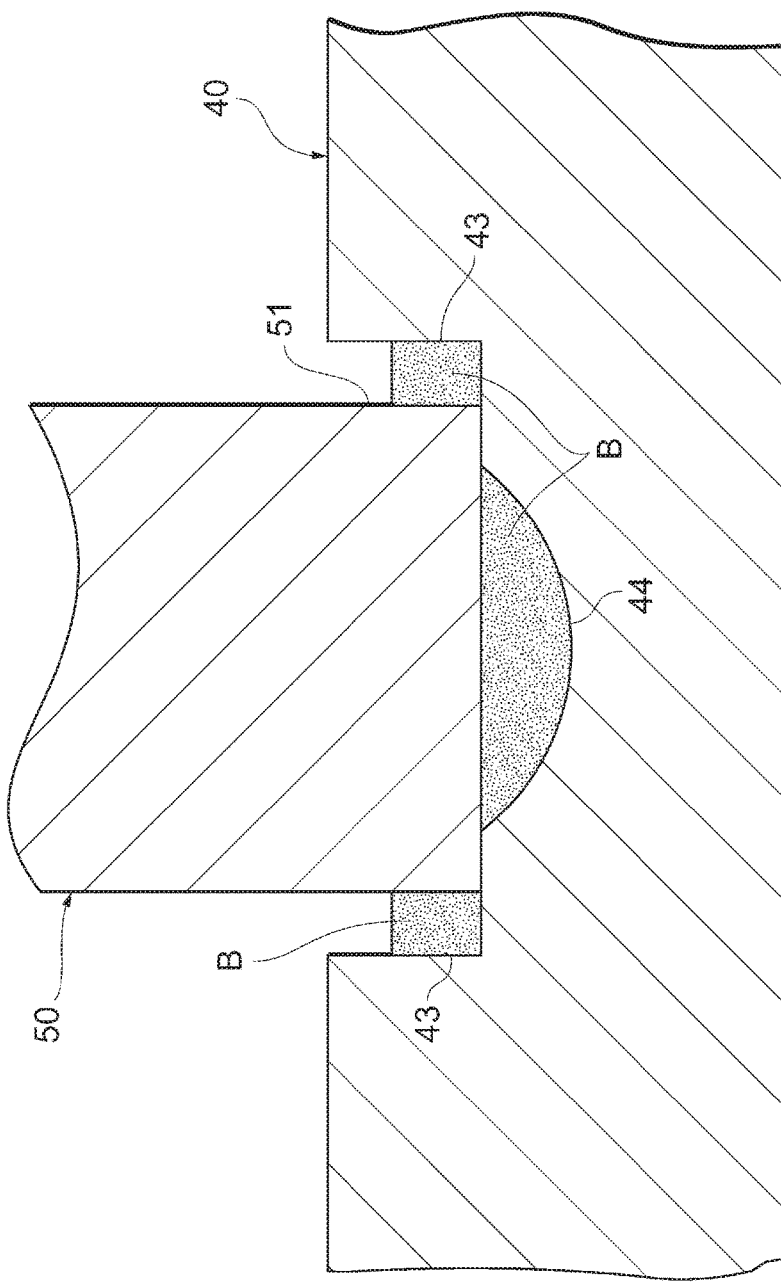

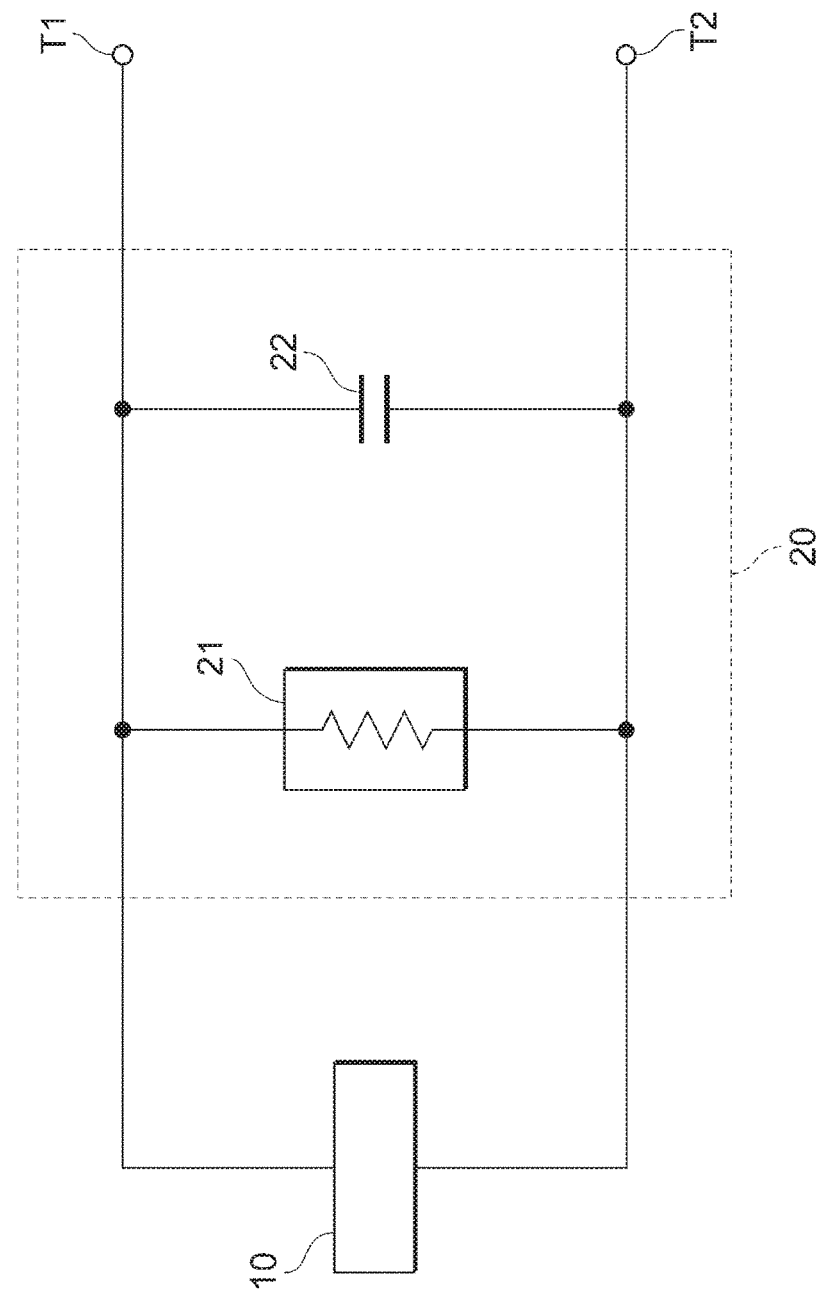

PYRANOMETER

CROSS-REFERENCE TO RELATED APPLICATIONS

This application is a continuation of patent application Ser. No. 15/515,129 filed on Mar. 28, 2017, which is National Stage Application of International Application No. PCT/JP2015/079101, filed Oct. 14, 2015, the disclosure of which is incorporated herein by reference in its entirety. The International Application No. PCT/JP2015/079101 is entitled to and claims benefit of Japanese Patent Applications No. 2015-141623, filed on Jul. 15, 2015, and No. 2015-185829, filed on Sep. 18, 2015, the disclosures of which are incorporated herein by reference in their entireties.

TECHNICAL FIELD

Some of the aspects regarding this invention are related to a pyranometer which measures, for example, the intensity of solar irradiance and the amount of solar radiation.

BACKGROUND OF THE INVENTION

Over a long period of time, the solar radiation has been measured with a radiation sensor which is called pyranometer, defined and categorized by ISO9060 standard. The conventional pyranometer uses a thermal sensor with a black absorbent material surface for receiving the radiation within the range of solar spectrum (main wavelength range 300 nm to 3000 nm).

In a pyranometer, it is important to obtain accurate irradiance for every incident angle of the sun light that changes depending on the time.

PRIOR ART DOCUMENTS

Non-Patent Document 1:
Frank Vignola, et al., "SOLAR AND INFRARED RADIATION MEASUREMENTS", CRC Press

SUMMARY OF THE INVENTION

Problems to be Solved by the Invention

In the pyranometer which uses a thermal sensor, there has been a problem in which a difference may be generated between a sensor output value and a theoretical value according to the cosine response (referred to as a "Cos error" hereafter).

This invention has been made in view of the problems mentioned above and it is an object of the invention to provide a pyranometer which is able to reduce the Cos error.

Means to Solve Problems

As a result of the intensive studies to solve the above problem, the inventors have found that the Cos error is caused by, for example, the effects of a glass dome which is mounted so as to be opposed to an incident surface of a thermal sensor. Means to solve above problem are as set forth below.

<1> A pyranometer comprising a thermal sensor and a diffusing member positioned so as to be opposed to an incident surface of the thermal sensor.

<2> A pyranometer according to <1>, wherein the thermal sensor is a thermopile.

<3> A pyranometer according to <2>, wherein the thermopile is contained in a package.

<4> A pyranometer according to <3>, wherein the package is a CAN package.

<5> A pyranometer according to <4>, wherein the CAN package is sealed airtight and filled with gas, and the CAN package has a window.

<6> A pyranometer according to any one of <2> to <5>, wherein the thermopile is a thin-film thermopile.

<7> A pyranometer according to <6>, wherein the thin-film thermopile is a silicon-based thermopile.

<8> A pyranometer according to <1>, wherein the diffusing member has an incident surface, an opposite surface thereof, and a side surface.

<9> A pyranometer according to any one of <2> to <7>, wherein the thermopile has a broad and flat spectral response relative to the solar spectrum.

<10> A pyranometer according to any one of <1> to <9>, wherein the diffusing member has broad and flat spectral characteristics relative to the solar spectrum.

<11> A pyranometer according to <5>, wherein the window has broad and flat spectral characteristics relative to the solar spectrum.

<12> A pyranometer according to any one of <1> to <11>, further comprising a holding member which holds the diffusing member so that light is incident on the incident surface of the diffusing member.

<13> A pyranometer according to any one of <1> to <12>, wherein the diffusing member is positioned so that light is incident on the side surface of the diffusing member.

<14> A pyranometer according to <12>, wherein the holding member has a groove that is formed around the diffusing member so that the light is incident on the side surface of the diffusing member.

<15> A pyranometer according to any one of <1> to <14>, wherein the diffusing member is held so that the incident surface is higher than a bottom surface of the groove.

<16> A pyranometer according to any one of <1> to <15>, wherein there is a distance between the opposite surface of the diffusing member and a receiving surface of the thermal sensor.

<17> A pyranometer according to <14>, wherein the holding member has an insertion groove formed so as to surround the groove, the pyranometer further comprising a dome with light transmission properties and with a peripheral edge thereof configured to be inserted in the insertion groove, the insertion groove having a recess configured to be filled with a joining material.

<18> A pyranometer according to <17>, wherein the recess has a curved surface.

<19> A pyranometer according to any one of <1> to <18>, further comprising a temperature compensation circuit which compensates for an output signal from the thermal sensor based on the temperature of the thermal sensor.

<20> A pyranometer according to <19>, wherein the temperature compensation circuit is connected in parallel with the thermal sensor and the temperature compensation circuit includes a resistive element whose resistance value changes depending on the temperature.

<21> A pyranometer according to <20>, wherein the resistive element is a thermistor.

<22> A pyranometer according to any one of <19> to <21>, wherein the temperature compensation circuit has filter provided on an output side.

Effects of Claimed Invention

According to one of the aspects of this invention, it is possible to achieve a pyranometer that reduces a Cos error with the use of a thermal sensor and a diffusing member.

BRIEF DESCRIPTIONS OF THE DRAWINGS

FIG. 3 is a graph which shows an example of an incident-angle dependency of a Cos error ε for each distance D in the pyranometer according to an embodiment of the present invention.

FIG. 4 is a graph which shows an example of an incident-angle dependency of a Cos error ε for each groove depth DE in a pyranometer according to an embodiment of the present invention.

FIG. 5 is a graph which shows an example of an incident-angle dependency of a Cos error ε for each transmittance of a diffusing member in a pyranometer according to an embodiment of the present invention.

FIG. 6 is an enlarged side cross-sectional view which shows an example of an insertion groove in a pyranometer according to an embodiment of the present invention.

FIG. 7 is a circuit diagram which describes an electric connection between a sensor and a temperature compensation circuit, according to an embodiment of the present invention.

DETAILED DESCRIPTION OF THE INVENTION

Figure 1:
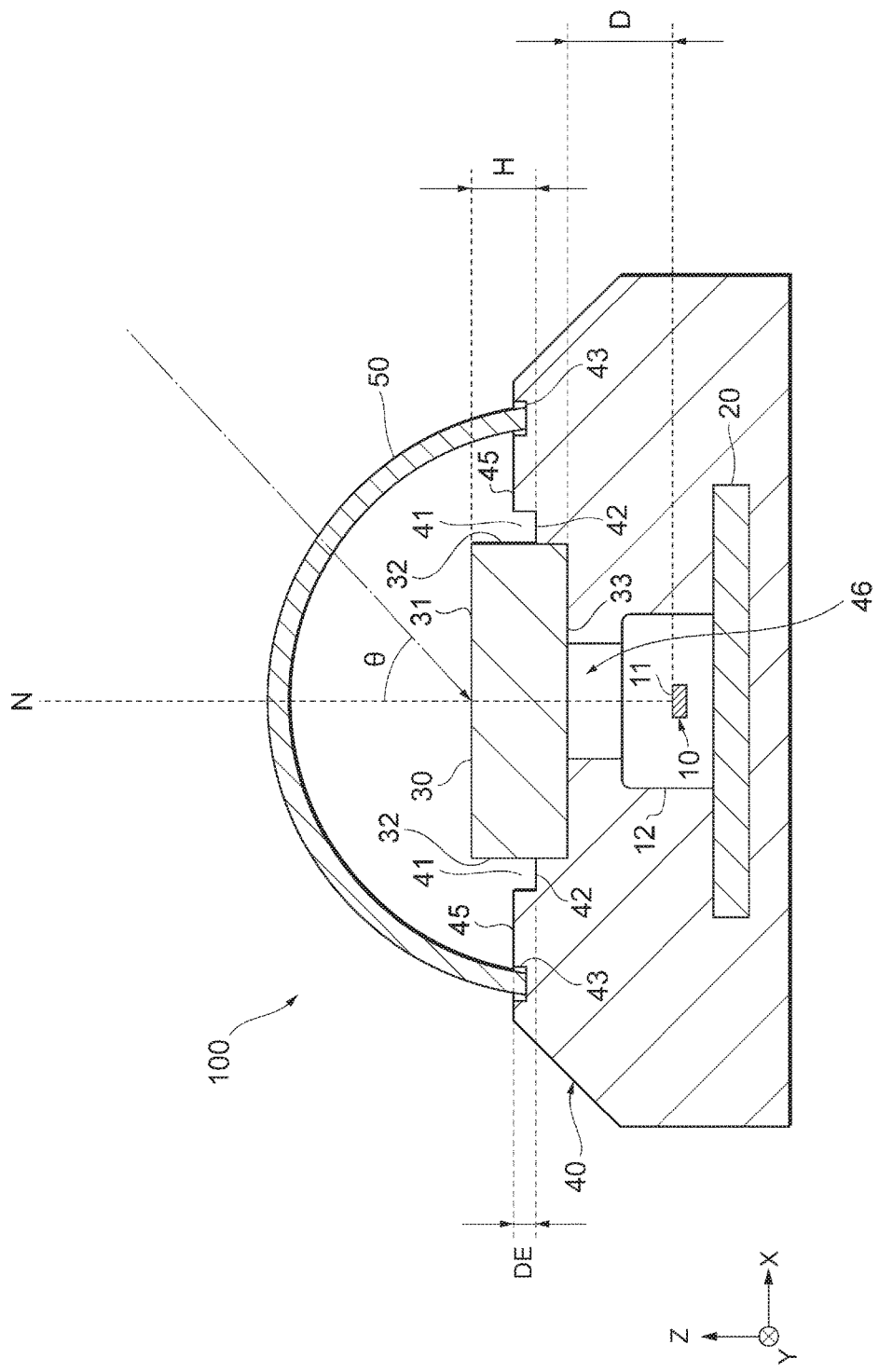
FIG. 1 is a side cross-sectional view which schematically shows an example of a structure of a pyranometer according to an embodiment of the present invention.

Illustrative embodiments of this invention will be described below. The same part or similar parts are indicated using the same reference symbol or similar reference symbols. However, the drawings are schematic drawings; therefore the details such as dimensions should be determined by referring to the description below. In addition, some drawings may contain, as a matter of course, parts whose dimensional relationships or ratios differ between the drawings. Moreover, the technical scope of this invention should not be understood so as to be limited to the embodiments described herein. In the following descriptions, the top side of the drawing is called as "top", bottom side as "bottom", left side as "left", and right side as "right".

FIGS. 1 to 11 show illustrated embodiments of a pyranometer according to this invention. FIG. 1 is a side cross-sectional view which schematically shows an example of a structure of a pyranometer 100 according to an embodiment of the present invention. The pyranometer 100 measures the intensity of solar irradiance from all directions of sky, i.e., from the range of 2π steradian solid angle. As shown in FIG. 1, the pyranometer 100 has, for example, a sensor 10, a temperature compensation circuit 20, a diffusing member 30, a holding member 40, and a dome 50.

The diffusing member 30 is an optical element that has an incident surface, an opposite surface thereof and a side surface, and it is structured so as to diffuse and transmit the light incident thereon. The diffusing member 30 is preferably capable of not only diffusing the light on the surface which is formed irregularly, but also diffusing the light in the inside thereof. Such diffusing member 30 can be constructed with materials having air bubbles inside (porous material), such as bubble quartz. The transmittance of the diffusing member is substantially uniform relative to the solar spectrum (300 to 3000 nm). The variable range of transmittance of this diffusing member 30 is within ±30%, preferably within ±10%, or more preferably within ±3%, and such substantially uniform transmittance makes it possible to achieve a pyranometer with satisfactorily broad spectral characteristics.

The diffusing member 30 is positioned so as to be opposed to a receiving surface 11 of the sensor 10, such that the light diffused in and transmitted through the diffusing member 30 is incident on the receiving surface 11 of the sensor 10.

Figure 11:
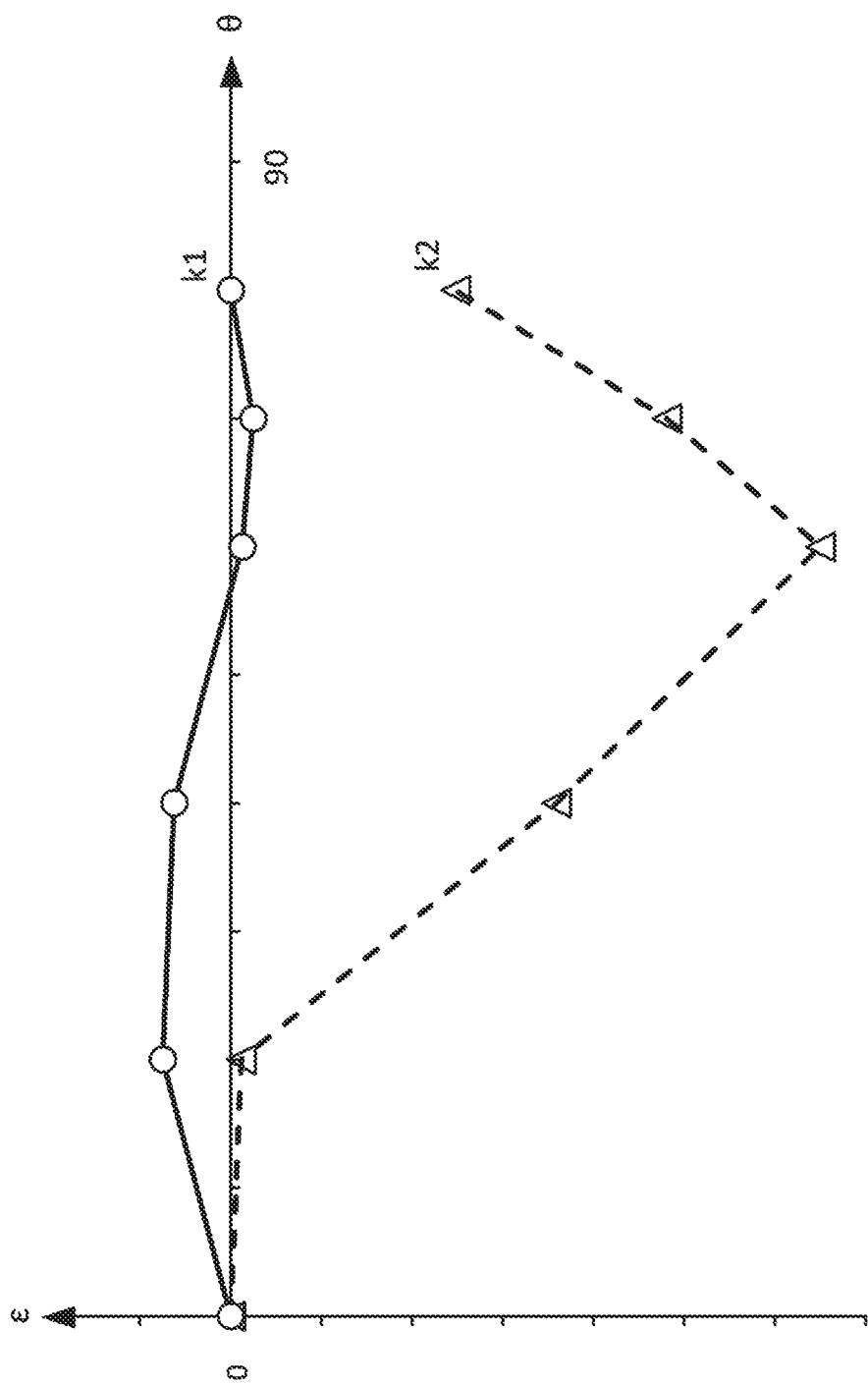
FIG. 11 is a graph which shows an example of an incident-angle dependency of a Cos error ε with or without the diffusing member in a pyranometer according to an embodiment of the present invention.

FIG. 11 is a graph which shows an example of a relationship between an angle θ and a Cos error ε in the pyranometer 100 according to an embodiment of the present invention. In FIG. 11, the horizontal axis represents the angle θ with the unit of, for example, [°]. The vertical axis represents the Cos error ε with the unit of, for example, [W/m$^2$]. Further the graph in FIG. 11 shows how the Cos error ε changes when the diffusing member 30 is used (expressed with k1) and when the diffusing member 30 is not used (expressed with k2). FIG. 11 shows that the Cos error ε is reduced when the diffusing member 30 is used, as compared to the Cos error ε in the case where the diffusing member 30 is not used. Accordingly, the Cos error can be reduced by using the diffusing member 30.

The sensor 10 is a thermal sensor, examples of which include a thermopile, a thermistor, a Peltier device, a thermocouple or a platinum resistance thermometer sensor. If a thermopile is employed as the sensor 10, then it is configured to convert light (light energy) incident on the receiving surface 11 into heat (thermal energy), and to output an electrical signal corresponding to the heat.

Figure 10:
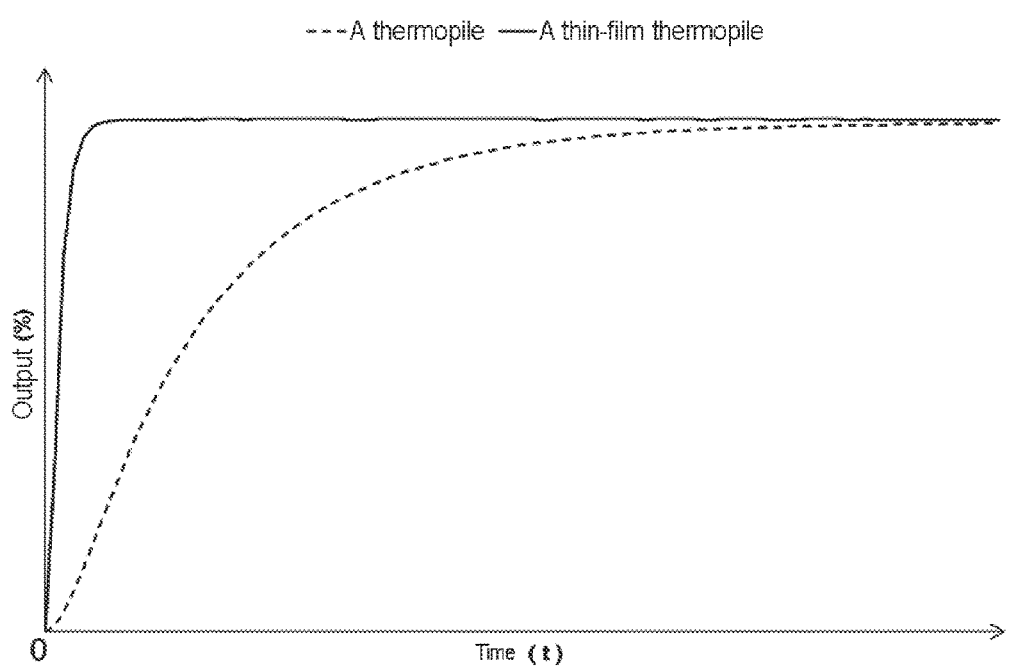
FIG. 10 is a graph which shows the comparison of sensor response speeds in a pyranometer according to an embodiment of the present invention.

By employing the thin-film thermopile, the sensor 10 can allow the pyranometer to shorten its response time against the light. FIG. 10 shows the response characteristics of a conventional thermopile and the thin-film thermopile proposed in this invention. The horizontal axis represents the response time, and the vertical axis represents the sensor output (normalized). From FIG. 10, it is understood that the sensor using a thin-film thermopile has better response characteristics than a thermopile.

By using the silicon-based thermopile, the thin-film thermopile can use the microfabrication technology, such as MEMS (Micro Electro Mechanical System), and can thus be manufactured more easily and stably. Moreover, the silicon-based thermopile 10 has a substantially uniform spectral response relative to the solar spectrum (300 nm to 3000 nm). By placing the sensor 10 in a metallic container 12 such as a CAN package, the mechanical strength of the sensor 10 can be enhanced, and by further sealing the sensor 10 airtight in the container 12, effects from the harsh outside environment can be reduced and the long-term stability of the sensor 10 can be improved. In addition, by filling the container 12 with a specific gas (e.g., an inert gas containing nitrogen, noble gas (He, Ar, Xe, Ne, etc.), the long-term stability of the sensor 10 is further improved. Furthermore by bonding a peripheral edge 51 of a later-mentioned dome 50 to an insertion groove 43 with a joining material B, the airtightness inside the device is enhanced and the long-term stability of the sensor is further improved. In order to allow light to be incident on the sensor 10, the container 12 is provided with an opening along the periphery (outer diameter) of the sensor 10 and configured to be sealable with a window (not shown). The window for sealing has a high transmittance of 50% or more that is substantially uniform relative to the entire solar spectrum (300 nm to 3000 nm), and such transmittance allows to achieve an excellent pyranometer with broad spectral characteristics while maintaining the sealing performance. Also by storing the sensor 10 in a CAN package, the overall device including the holding member 40 and the CAN package can form a double structure to break direct contact from the outside and prevent thermal migration to and from the outside of the container 12, thereby reducing the offset amount of the sensor.

The temperature compensation circuit 20 is provided on a circuit board which is arranged near the sensor 10. The temperature compensation circuit 20 is electrically connected to the sensor 10 and structured so as to compensate for an output signal of the sensor 10 based on the temperature of the sensor 10.

The holding member 40 serves as a base of the pyranometer 100; it is provided with the sensor 10, temperature compensation circuit 20, diffusing member 30, and dome 50. The holding member 40 is constituted by one or more parts, and it is preferably formed of a material having a predetermined or more strength as well as a predetermined or more thermal conductivity For example it can be constructed with a metal material such as aluminum. The holding member 40 holds the diffusing member 30 so that an incident surface 31 and the side surface 32 are exposed. To be more precise, the holding member 40 holds the diffusing member 30 so that, for example, the incident surface 31 of the diffusing member 30 becomes higher than a top surface 45 of holding member 40.

The dome 50 is to protect the inside of the pyranometer 100 from, for example, rain and wind. The dome 50 can be constructed with a material which has light transmission properties, such as glass. The dome 50 has a hemispherical shape so that the light from the sky enters the exposed incident surface 31 and side surface 32 of the diffusing member 30.

Furthermore, the configuration of the pyranometer 100 is not limited to the case having the dome 50 and, for example it may not have the dome 50.

Here, not only irradiance in the vertical direction relative to the receiving surface 11 of the sensor 10 but also irradiance with a zenith angle $\theta$ ($0<\theta\leq90°$) relative to the vertical axis N are incident on the incident surface 31 of the diffusing member 30. On the incident surface 31 of the diffusing member 30, the irradiance E of the light incident on the incident surface 31 of the diffusing member 30 with a zenith angle $\theta$ has cosine response (it is also called directional response), and it is expressed by the following formula (1) using the irradiance $E_0$ of the irradiance incident in the vertical direction.

$$E=E_0 \cos \theta \quad (1)$$

As is obvious from the formula, the irradiance E of the light incident with an angle $\theta$ has a characteristic (property) in which it becomes cos $\theta$ times of the irradiance $E_0$. However the surface reflectance of light increases, as the zenith angle $\theta$ increases and a Cos error is generated due to the effects of dome 50 which is mounted so as to be opposed to the receiving surface 11 of sensor 10.

In light of the above, by allowing the light to be incident on the sensor through the diffusing member, the Cos error can be reduced as compared to the conventional pyranometer. Problems will not arise while the angle $\theta$ of the light incident on the receiving surface 11 of the sensor 10 is relatively small.

Moreover, in the pyranometer 100 of this illustrative embodiment, the holding member 40 has a groove 41 configured to be formed around the diffusing member 30 so that part of the side surface of diffusing member 30 is exposed. When using the sensor 10 in the container 12, since the incident light becomes restricted by the container 12 as the angle $\theta$ of the light incident on the receiving surface of the sensor 10 increases, and the above mentioned Cos error may increase; however by providing this groove, part of the side surface 32 of diffusing member 30 is exposed, in addition to the light incident on the incident surface 31 of diffusing member 30, light is also incident on the side surface 32 of the diffusing member 30 from diagonal and horizontal directions, so that it becomes possible to reduce the above mentioned Cos error, which is even more preferable.

The groove 41 is preferably formed along the entire circumference of the side surface 32 (outer diameter) of the diffusing member 30. In this case, for example, when the shape of the side surface (outer diameter) of diffusing member 30 is circular in planar view, the groove 41 should be circular (annular).

Also the incident surface 31 of the diffusing member 30 is held higher than the bottom surface 42 of the groove 41. Therefore, there is a height H in between the incident surface 31 of the diffusing member 30 and the bottom surface 42 of groove 41.

Figure 2:
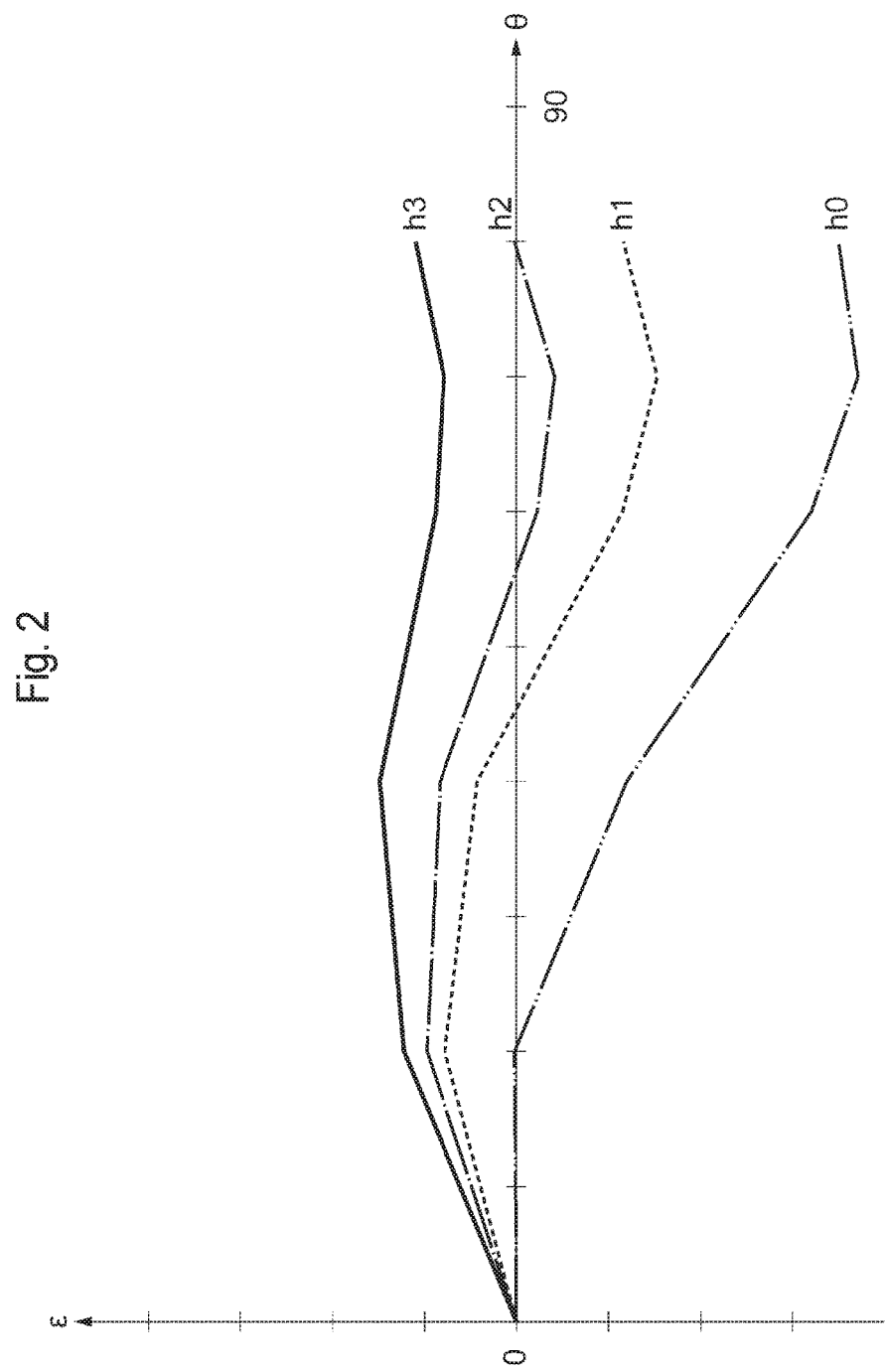
FIG. 2 is a graph which shows an example of an incident-angle dependency of a Cos error ε for each height H in the pyranometer according to an embodiment of the present invention.

FIG. 2 is a graph which shows an example of relationships between the angle $\theta$ and the Cos error $\varepsilon$ for each height H in the pyranometer 100 according to an embodiment of the present invention. In FIG. 2, the horizontal axis represents the angle $\theta$ with the unit of, for example, [20]. Also, the vertical axis represents the Cos error $\varepsilon$ with the unit of, for example, [W/m²]. Further the graph in FIG. 2 shows changes in the Cos error ε when the height H is h1, h2, or h3 relative to the angle θ. Moreover, for reference, h0 is indicated to represent the case where the height H is zero. When the height H is zero, the Cos error ε tends to increases the angle θ increases, as shown in FIG. 2. On the other hand, it can be seen that, when the pyranometer 100 has the height H, the Cos error ε changes and becomes smaller compared to the Cos error ε with the height H being zero. Based on this point, the Cos error ε can be compensated for by adjusting the height H between the top surface of the diffusing member 30 and the bottom surface 42 of the groove 41. As a result, the Cos error ε can be reduced by setting the appropriate value for the height H between the incident surface 31 of the diffusing member 30 and the bottom surface 42 of the groove 41.

As shown in FIG. 1, the diffusing member 30 is arranged with the opposite surface 33 thereof separated from the receiving surface 11 of the sensor 10. Therefore, there is a distance D between the opposite surface 33 of the diffusing member 30 and the receiving surface 11 of the sensor 10.

FIG. 3 is a graph which shows an example of relationships between the angle θ and the Cos error ε for each distance D in pyranometer 100 according to an embodiment of the present invention. In FIG. 3, the horizontal axis represents the angle θ, with the unit of, for example, [°]. Also, the vertical axis represents the Cos error ε with the unit of, for example, [W/m²]. The graph in FIG. 3 shows changes in the Cos error ε when the distance D is d1, d2, d3, or d4 relative to the angle θ. As shown in FIG. 3, when the pyranometer 100 has the distance D, the Cos error ε changes as the distance D changes. Based on this point, the Cos error ε can be compensated for by adjusting the distance D between the bottom surface 33 of the diffusing member 30 and the receiving surface 11 of the sensor 10. As a result, the Cos error ε can be reduced by setting the appropriate value for the distance D between the bottom surface 33 of the diffusing member 30 and the receiving surface 11 of the sensor 10.

As shown in FIG. 1, there is a depth DE between the top surface 45 of the holding member 40 and the bottom surface 42.

FIG. 4 is a graph which shows an example of relationships between the angle θ and the Cos error ε for each depth DE of the groove 41 in the pyranometer 100 according to an embodiment of the present invention. In FIG. 4, the horizontal axis represents the angle θ with the unit of, for example, [°]. The vertical axis represents the Cos error ε with the unit of, for example, [W/m²]. Further the graph in FIG. 4 shows changes in the Cos error ε when the depth DE is de1, de2, de3, or de4 relative to the angle θ. As shown in FIG. 4, the Cos error ε changes as the depth DE of the groove 41 changes. Based on this point, the Cos error ε can be compensated for by adjusting the depth DE of the groove 41. As a result, the Cos error ε can be reduced by setting the appropriate value for the depth DE of the groove 41.

A certain effect can also be obtained by performing compensation of the cosine response for the Cos error ε using other methods than the above-mentioned methods, such as adjusting the size of an opening formed in the container 12, the size of a light guide path 46 formed, in the holding member 40, to connect the receiving surface 11 of the sensor 10 and the the diffusing member 30, etc.

Furthermore, since the diffusing member 30 allows the incident light to be diffused and transmitted therethrough, it has a transmittance T.

FIG. 5 is a graph which shows an example of relationships between the angle θ and the Cos error for each transmittance T of the diffusing member 30 in the pyranometer 100 according to an embodiment of the present invention. In FIG. 5, the horizontal axis represents the angle θ with the unit of, for example, [°]. The vertical axis represents the Cos error ε (a difference between an output value and a theoretical value) with the unit of, for example, [W/m²]. Further the graph in FIG. 5 shows changes in the Cos error ε when the transmittance T is τ1, τ2, or τ3 relative to the angle θ. As shown in FIG. 5, the Cos error ε changes as the transmittance T of the diffusing member 30 changes. Based on this point, the Cos error ε can be compensated for by adjusting the transmittance T of the diffusing member 30. Accordingly, the Cos error ε can be reduced by setting an appropriate value for the transmittance T of the diffusing member 30.

It has also been found that the Cos error ε changes as the thickness (length in the Z-axis direction in FIG. 1) of the diffusing member 30 changes, although it is not illustrated in the drawings.

As shown in FIG. 1, the holding member 40 has the insertion groove 43 which is formed so as to surround the groove 41. The peripheral edge 51 of the dome 50 is inserted in the insertion groove 43 and the dome 50 is thereby fixed on the holding member 40. When the dome 50 is in a substantially hemispherical shape, the shape of the insertion groove 43 should be circular (annular) in planar view.

FIG. 6 is an enlarged cross-sectional view which shows an example of the insertion groove 43 in the pyranometer 100 according to an embodiment of the present invention. As shown in FIG. 6, the insertion groove 43 has a recess 44 in the bottom surface. The recess 44 is filled with a joining material B, and the joining material B is accumulated in the recess 44 and in the bottom surface of the insertion groove 43. When the peripheral edge 51 of the dome 50 is inserted to the insertion groove 43 in this state, the joining material B adheres to the bottom surface and part of the side surfaces of the peripheral edge 51. As described above, by providing the recess 44 in the insertion groove 43 in which the peripheral edge 51 of the dome 50 is to be inserted, it is possible to create the state in which the joining material B is accumulated in the recess 44 and on the bottom surface of the insertion groove 43, i.e., it is possible to form a joining material B pool, and it is therefore possible to increase the boding surface area of the peripheral edge 51. Thus the airtightness inside the dome 50 can be increased. The joining material may be of any type as long as it can join objects together, such as an adhesive and a tackiness agent.

As shown in FIG. 6, the recess 44 preferably has, for example, a curved surface. With this configuration, the joining material B pool can be easily formed (achieved) in the recess 44 and on the bottom surface of the insertion groove 43.

FIG. 7 is a circuit diagram which describes the electrical connection between the sensor 10 and the temperature compensation circuit 20 according to an embodiment of the present invention. As shown in FIG. 7, the temperature compensation circuit 20 is constructed by including for example a resistive element 21 and a filter 22.

The resistive element 21 is constructed so that its resistance value changes depending on the temperature. The resistive element 21 is arranged near the sensor 10. With this configuration, the temperature of the resistive element 21 can be equated with the temperature of the sensor 10.

The resistive element 21 is connected in parallel to the sensor 10. The resistive element 21 whose resistance value changes depending on the temperature can be constituted by, for example, a thermistor.

Here, the sensor 10 used in the pyranometer 100 may have temperature dependency in its output signal. In such case, even when the optical energy from the solar radiation incident on the receiving surface 11 is the same, the output signal value changes depending on the temperature of the sensor 10.

On the other hand, since the resistive value of the resistive element 21 changes depending on the temperature, changes in the output signal of the sensor 10 depending on the temperature characteristics can be balanced out through changes in the resistive value of the resistive element 21 depending on the temperature of the sensor 10, and the output signal of the sensor 10 can therefore be compensated for. With such configuration, when the energy of the solar light to be incident on the receiving surface 11 is the same, the value of the output signal of the sensor 10 can be kept constant, without depending on the temperature of the sensor 10.

For example, when the output signal of the sensor 10 changes at a coefficient k (k is a positive real number) relative to the temperature, the resistive element 21 preferably employs, for example, an NTC (Negative Temperature Coefficient) thermistor whose resistance value changes at a coefficient—k relative to the temperature.

The filter 22 is used for filtering the output signal of the sensor 10 and it is provided on the output side of the temperature compensation circuit 20. The filter 22 is connected in parallel with the sensor 10. The filter 22 may be, for example, a capacitor.

The sensor 10 used in the pyranometer 100 may have a high internal impedance. Therefore, by providing the filter 22 on the output side of the temperature compensation circuit 20, the noise of the output signal of the sensor 10, which is cause by the internal impedance, can be removed.

In this illustrative embodiment, FIG. 1 shows an example in which there is only one surface level (one step) between the top surface 45 of the holding member 40 and the bottom surface 42 of the groove 41; however the configuration is not limited thereto. As long as a part of side surface of the diffusing member 30 is exposed, there may be multiple surface levels (multiple steps) between the top surface 45 of holding member 40 and the bottom surface 42 of the groove 41. Also, the bottom surface 42 of the groove 41 is not limited to a flat surface, but it may alternatively be a concave surface, convex surface, tilted surface, or any combination thereof.

Also, in this illustrative embodiment, FIG. 1 shows an example in which an exposed surface of the diffusing member 30, on which light is incident is flat; however, the configuration is not limited thereto. The exposed surface of the diffusing member 30 can be of any shape.

Figure 8A:
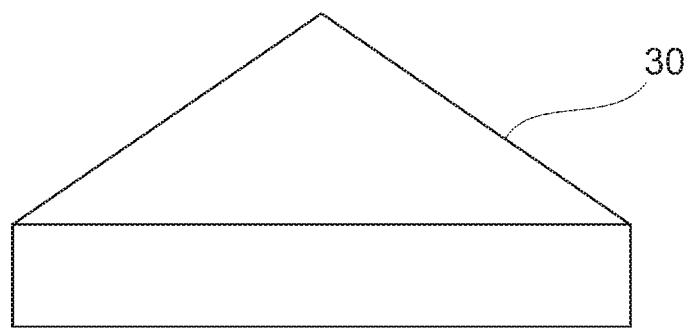
FIG. 8A is a side-view which describes an exposed surface of the diffusing member (Example 1) according to an embodiment of the present invention.
Figure 8B:
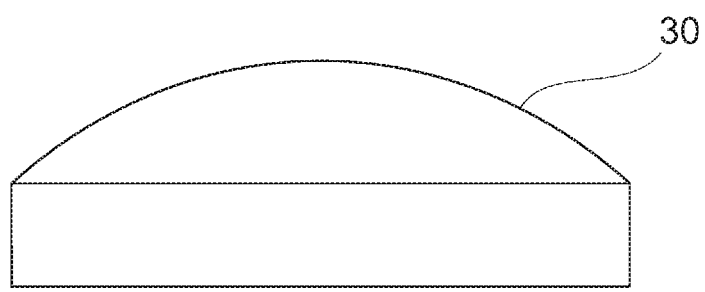
FIG. 8B is a side-view which describes an exposed surface of the diffusing member (Example 2) according to an embodiment of the present invention.
Figure 8C:
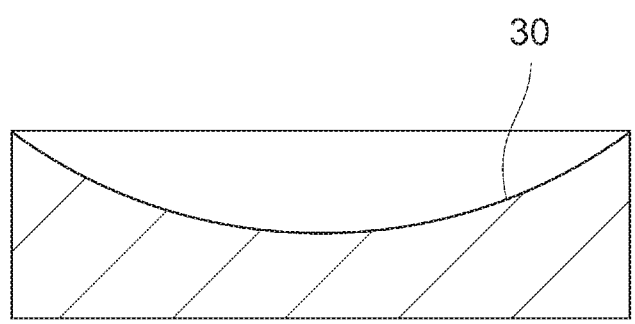
FIG. 8C is a cross-sectional view which describes an exposed surface of the diffusing member (Example 3) according to an embodiment of the present invention.
Figure 8D:
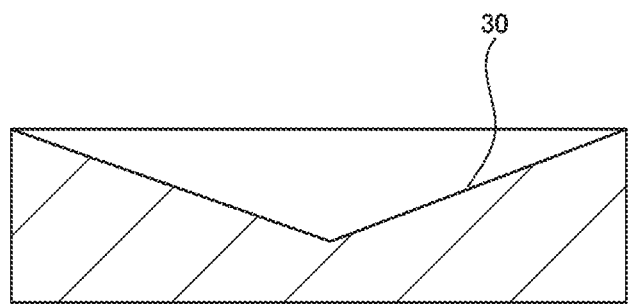
FIG. 8D is a cross-sectional view which describes an exposed surface of the diffusing member (Example 4) according to an embodiment of the present invention.

FIGS. 8A and 8B are side views which describe examples of the exposed surface of the diffusing member 30 according to the illustrative embodiments. FIGS. 8C and 8D are diagrams which illustrate examples of the exposed surface on the diffusing member 30 according to the illustrated embodiment, which are cross-sectional views taken along the centerline of the diffusing member 30. The incident surface 31 of the diffusing member 30 can be, for example, a conical surface as shown in FIG. 8A, a convex surface as shown in FIG. 8B, a concave surface as shown in FIG. 8C, or an inverted conical surface as shown in FIG. 8D.

Moreover in this illustrative embodiment, FIG. 6 shows an example in which the recess of the insertion groove 43 has the recess 44, but the configuration is not limited thereto. The recess 44 of the insertion groove 43 can be of any shape.

Figure 9A:
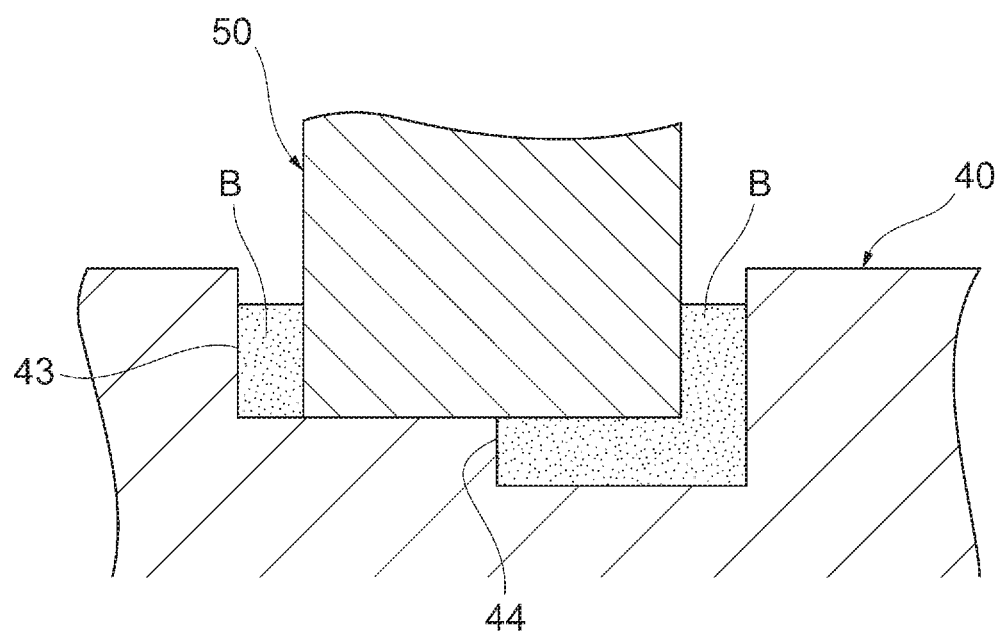
FIG. 9A is an enlarged cross-sectional view which describes a recess of an insertion groove in a pyranometer (Example 1) according to an embodiment of the present invention.
Figure 9B:
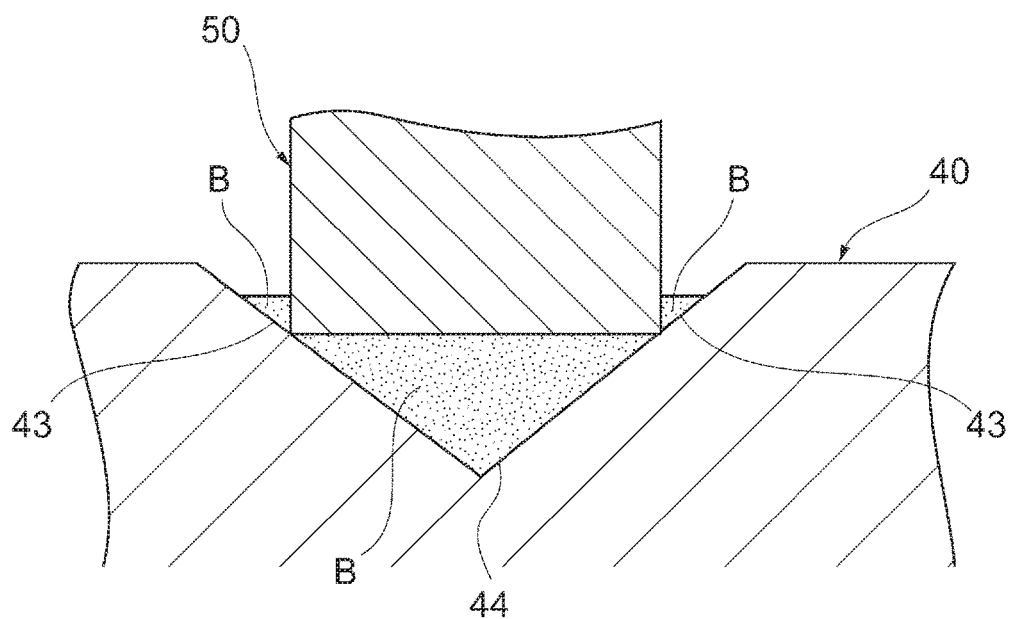
FIG. 9B is an enlarged cross-sectional view which describes a recess of an insertion groove in a pyranometer (Example 2) according to an embodiment of the present invention.
Figure 9C:
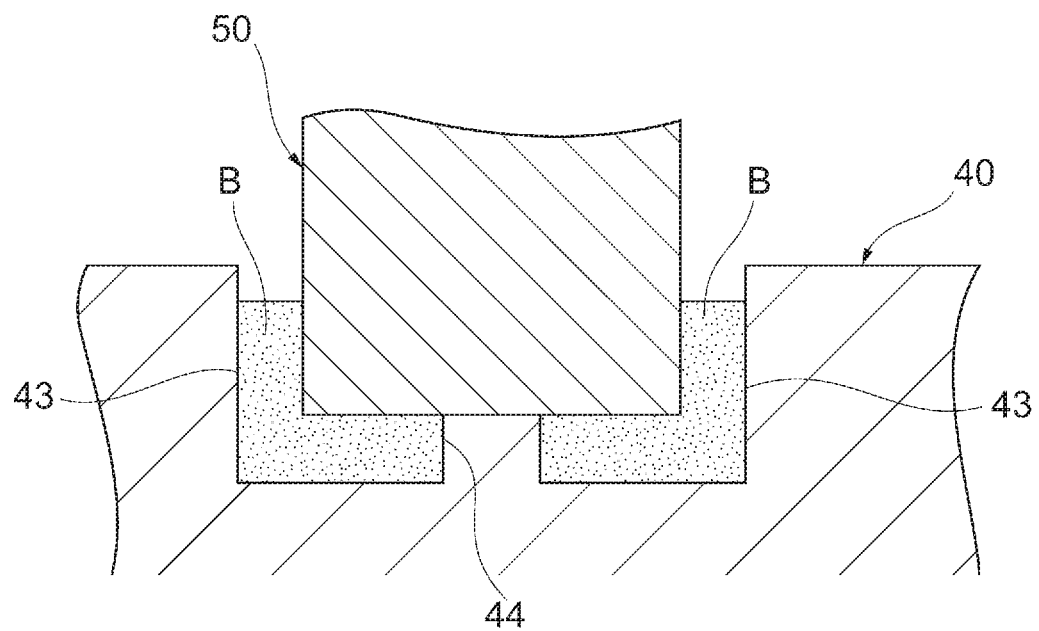
FIG. 9C is an enlarged cross-sectional view which describes a recess of an insertion groove in a pyranometer (Example 3) according to an embodiment of the present invention.

FIGS. 9A to 9C are enlarged cross-sectional views which illustrate examples of the recess 44 of the insertion groove 43 in the pyranometer 100 according to one illustrative embodiments. The recess 44 of the insertion groove 43 can be, for example, a step-shaped as shown in FIG. 9A, a V-shaped as shown in FIG. 9B, or a shape having a projection as shown in FIG. 9C.

As described above, according to the pyranometer 100 of the illustrated embodiment, the Cos error $\varepsilon$, which is a difference between the output value of the sensor 10 and the theoretical value based on the cosine response can be reduced while using the thermal sensor 10 and the diffusing member 30.

In the pyranometer 100 comprising the sensor 10, which is a silicon-based thin-film thermopile sealed airtight in a CAN package, and the temperature compensation circuit 20 according to another embodiment, it is possible to improve a response speed, improve temperature characteristics, reduce offset and impacts from the harsh outside environment, and thereby enhance the long-term stability.

As described above, the pyranometer 100 according to this illustrative embodiment has improved the response speed, improved the temperature characteristics, reduced offset amount, reduced impacts from the harsh outside environment and increased the long-term stability by employing the silicon-based thin-film thermopile 10 which is sealed airtight in CAN package. In addition, the pyranometer 100 has the sensor 10, the diffusing member 30 which is arranged so as to be opposed to the receiving surface 11 of the sensor 10, and the holding member 40 which holds the diffusing member 30 so that its incident surface 31 is exposed, the holding member 40 having the groove 41 which is formed around the diffusing member 30 so that a part of its side surface 32 is exposed. Due to the above configuration, since, in addition to the light incident on the incident surface 31 of the diffusing member 30, light is incident on the side surface 32 of the diffusing member 30 in diagonal and horizontal directions, it is possible to compensate for the output of the sensor 10 relative to the light incident at an angle θ. With such configuration, the Cos error $\varepsilon$ between the output value of the sensor 10 and the theoretical value based on the cosine response, can be reduced.

Further this invention is not limited to the above illustrative embodiments and may be applicable with various modifications.

Moreover, the practical and application examples described through the illustrative embodiments can be used in appropriate combinations, or with any appropriate modification or improvement added thereto, and this invention is not limited to the above-described illustrative embodiment. It is obvious from the recitations in the scope of patent, that such configuration which is combined or modified or improved are included in the technical scope of this invention.

Aspects of this Invention:
This Invention may have Aspects as Follows.
(1) A pyranometer comprising a thermal sensor and a diffusing plate, that is placed in the zenith position relative to the thermal sensor.
(2) A pyranometer according to (1), comprising a holding member which holds the diffusing plate so that one surface of the diffusing plate is exposed.
(3) A pyranometer according to (1) or (2), wherein the holding member has a groove which is formed around the diffusing plate so that part of a side surface of the diffusing plate is exposed.

(4) A pyranometer according to any one of (1) to (3), wherein the diffusing plate is held so that said one surface is higher than a bottom surface of the groove.

(5) A pyranometer according to any one of (1) to (4), wherein the diffusing plate is positioned so that the other surface thereof is separated from a receiving surface of the thermal sensor.

(6) A pyranometer according to any one of (1) to (5), wherein the holding member has an insertion groove which is formed so as to surround the groove, the pyranometer further comprising a dome with light transmission properties and with a peripheral edge thereof configured to be inserted in the insertion groove, the insertion groove having a recess configured to be filled with adhesive tackiness agent.

(7) A pyranometer according to (6), wherein the recess has a curved surface.

(8) A pyranometer according to any one of (1) to (7), further comprising a temperature compensation circuit which compensates for an output signal from the thermal sensor based on a temperature of the thermal sensor.

(9) A pyranometer according to (8), wherein the temperature compensation circuit is connected in parallel with the thermal sensor and includes a resistive element whose resistance value changes depending on the temperature.

(10) A pyranometer according to (9), wherein the resistive element is a thermistor.

(11) A pyranometer according to any one of (8) to (10), wherein the temperature compensation circuit includes a filter provided on an output side.

(12) A pyranometer, comprising: a sensor; a diffusing plate which is placed in the zenith position relative to the sensor; a holding member which holds the diffusing plate so that one surface of the diffusing plate is exposed, the holding member having a groove which is formed around the diffusing plate so that part of a side surface of the diffusing plate is exposed.

(13) A pyranometer according to (12), wherein the diffusing plate is held so that said one surface is higher than a bottom surface of the groove.

(14) A pyranometer according to (12) or (13), wherein the diffusing plate is positioned so that the other surface is separated from a receiving surface of the sensor.

(15) A pyranometer according to any one of (12) to (14), wherein the holding member has an insertion groove formed so as to surround the groove, the pyranometer further comprising a dome with light transmission properties and with a peripheral edge configured to be inserted in the insertion groove, the insertion groove having a recess which is configured to be filled with a tackiness agent.

(16) A pyranometer according to (15), wherein the recess has a curved surface.

(17) A pyranometer according to any one of (12) to (16), further comprising a temperature compensation circuit which compensates for an output signal from the sensor based on the temperature of the sensor.

(18) A pyranometer according to (17), wherein the temperature compensation circuit is connected in parallel with the sensor and includes a resistive element whose resistance value changes depending on the temperature.

(19) A pyranometer according to (18), wherein the resistive element is a thermistor.

(20) A pyranometer according to any one of (17) to (19) wherein the temperature compensation circuit includes a filter provided on an output side.

DESCRIPTIONS OF NUMBERS

10 . . . Sensor
11 . . . Receiving Surface
20 . . . Temperature Compensation Circuit
21 . . . Resistive Element
22 . . . Filter
30 . . . Diffusing member
31 . . . Incident Surface
32 . . . Side Surface
33 . . . Opposite Surface
40 . . . Holding Member
41 . . . Groove
42 . . . Bottom Surface
43 . . . Insertion Groove
44 . . . Recess
45 . . . Top Surface
46 . . . Light Guide Path
50 . . . Dome
51 . . . Peripheral Edge
100 . . . Pyranometer
B . . . Joining material
D . . . Distance
H . . . Height
T . . . Transmittance
$\theta$ . . . Angle
$\varepsilon$ . . . Cos error

What is claimed is:

1. A pyranometer, comprising:
a thermal sensor; and
a diffusing member positioned so as to be opposed to a receiving surface of the thermal sensor,
wherein the diffusing member has a light incident surface, an opposite surface thereof, and a side surface, light being incident on the side surface of the diffusing member.

2. The pyranometer according to claim 1, wherein the thermal sensor is a thermopile.

3. The pyranometer according to claim 2, wherein the thermopile is contained in a package.

4. The pyranometer according to claim 3, wherein the package is a CAN package.

5. The pyranometer according to claim 4, wherein the CAN package is sealed airtight and filled with gas, and the CAN package has a window.

6. The pyranometer according to claim 5, wherein the window has broad and flat spectral characteristics relative to the solar spectrum.

7. The pyranometer according to claim 2, wherein the thermopile is a thin-film thermopile.

8. The pyranometer according to claim 7, wherein the thin-film thermopile is a silicon-based thermopile.

9. The pyranometer according to claim 2, wherein the thermopile has a broad and flat spectral response relative to the solar spectrum.

10. The pyranometer according to claim 1, wherein the diffusing member has broad and flat spectral characteristics relative to the solar spectrum.

11. The pyranometer according to claim 1, further comprising a holding member which holds the diffusing member so that light is incident on the incident surface of the diffusing member.

12. The pyranometer according to claim 11, wherein the holding member has a groove that is formed around the diffusing member.

13. The pyranometer according to claim 12, wherein the holding member has an insertion groove formed so as to surround the groove, the pyranometer further comprising a dome with light transmission properties and with a peripheral edge thereof configured to be inserted in the insertion groove, the insertion groove having a recess configured to be filled with a joining material.

14. The pyranometer according to claim 13, wherein the recess has a curved surface.

15. The pyranometer according to claim 1, wherein the diffusing member is held so that the incident surface is higher than a bottom surface of the groove.

16. The pyranometer according to claim 1, wherein there is a distance between the opposite surface of the diffusing member and a receiving surface of the thermal sensor.

17. The pyranometer according to claim 1, further comprising a temperature compensation circuit which compensates for an output signal from the thermal sensor based on the temperature of the thermal sensor.

18. The pyranometer according to claim 17, wherein the temperature compensation circuit is connected in parallel with the thermal sensor and the temperature compensation circuit includes a resistive element whose resistance value changes depending on the temperature.

19. The pyranometer according to claim 18, wherein the resistive element is a thermistor.

20. The pyranometer according to claim 17, wherein the temperature compensation circuit has a filter provided on an output side.

* * * * *